United States Patent
Furusawa

(10) Patent No.: US 11,056,279 B2
(45) Date of Patent: Jul. 6, 2021

(54) LAMINATE OF CERAMIC LAYER AND SINTERED BODY OF COPPER POWDER PASTE

(71) Applicant: JX Nippon Mining & Metals Corporation, Tokyo (JP)

(72) Inventor: Hideki Furusawa, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 16/506,600

(22) Filed: Jul. 9, 2019

(65) Prior Publication Data
US 2020/0043653 A1   Feb. 6, 2020

(30) Foreign Application Priority Data

Aug. 1, 2018 (JP) .............................. JP2018-145354

(51) Int. Cl.
*B22F 7/00* (2006.01)
*H01G 4/008* (2006.01)
*H01G 4/012* (2006.01)

(52) U.S. Cl.
CPC ............ *H01G 4/008* (2013.01); *H01G 4/012* (2013.01); *Y10T 428/12028* (2015.01); *Y10T 428/12056* (2015.01)

(58) Field of Classification Search
None
See application file for complete search history.

(56) References Cited

U.S. PATENT DOCUMENTS

| | | | | |
|---|---|---|---|---|
| 5,464,950 A | * | 11/1995 | Horiuchi | H01L 21/4857 174/250 |
| 2016/0230026 A1 | * | 8/2016 | Furusawa | B22F 7/008 |

FOREIGN PATENT DOCUMENTS

| | | |
|---|---|---|
| JP | 2016106175 A | 6/2016 |
| KR | 1020160035094 A | 3/2016 |
| TW | 201535416 A | 9/2015 |
| WO | 2013118892 A1 | 8/2013 |
| WO | 2013118893 A1 | 8/2013 |
| WO | 2013125659 A1 | 8/2013 |
| WO | WO-2013118892 A1 * | 8/2013 ........... H01G 4/2325 |

OTHER PUBLICATIONS

Chinese Office Action of the corresponding CN Pat. No. 201910674530.7, dated Jan. 15, 2021, 6 pages.
Korean Office Action in KR10-2019-0089986, dated Dec. 4, 2020, 5 pages.

* cited by examiner

*Primary Examiner* — Seth Dumbris
(74) *Attorney, Agent, or Firm* — Faegre Drinker Biddle & Reath LLP

(57) ABSTRACT

Provided is a laminate of a sintered body produced by sintering a copper powder paste and a ceramic substrate, which has improved adhesion between the sintered body and the ceramic substrate. A laminate with a copper powder paste sintered body laminated on a ceramic layer, the laminate comprising portions where one or more elements selected from Si, Ti and Zr derived from a copper powder surface treatment agent are together present with a thickness in a range of from 5 to 15 nm in boundaries between the copper powder paste sintered body and the ceramic layer, when observing the boundaries by scanning the laminate with STEM over 100 nm across the boundaries in a thickness direction of the laminate.

15 Claims, 6 Drawing Sheets
(6 of 6 Drawing Sheet(s) Filed in Color)

FIG. 1A
FIG. 1B
FIG. 1C
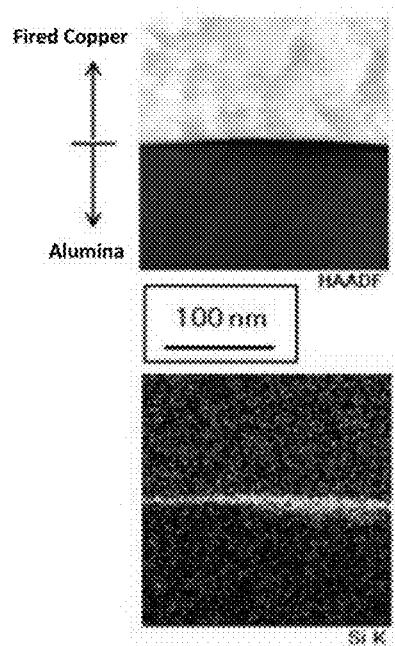
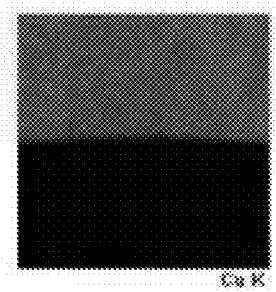
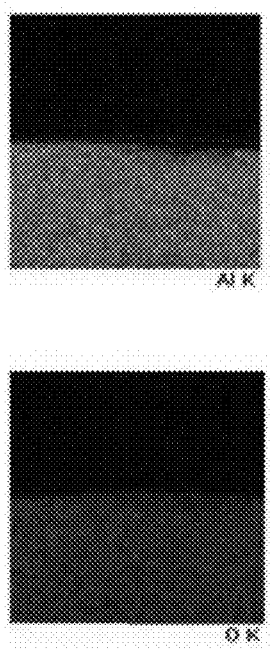
FIG. 1D
FIG. 1E

The concentration of each element was plotted from the alumina side in FIG. 1

The concentration of each element was plotted from the top of the alumina particle in FIG. 4 to copper.

FIG. 6
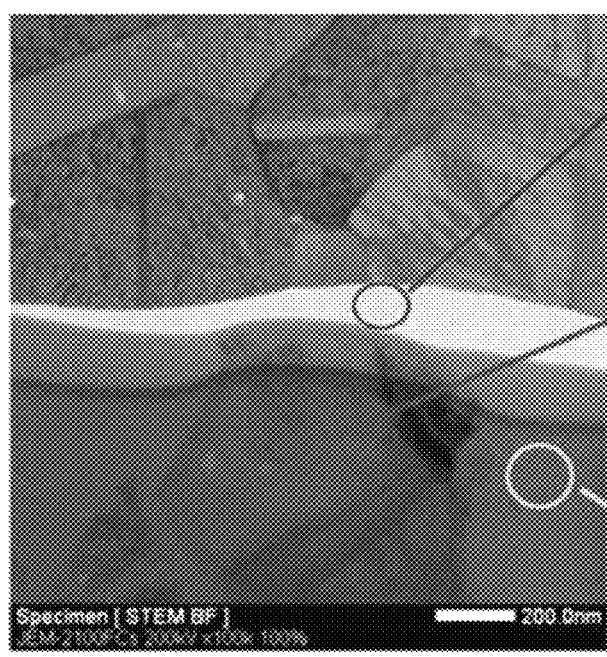
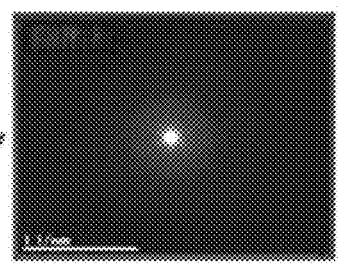
FIG. 6A
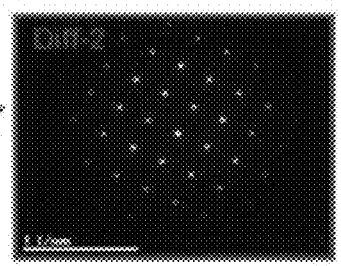
FIG. 6B
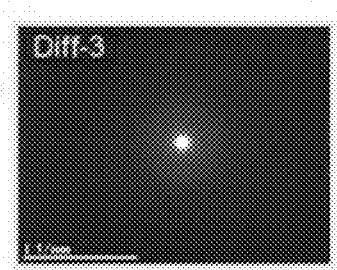
FIG. 6C

LAMINATE OF CERAMIC LAYER AND SINTERED BODY OF COPPER POWDER PASTE

TECHNICAL FIELD

The present invention relates to a laminate of a ceramic layer and a sintered body of a copper powder paste.

BACKGROUND ART

As operating frequency band of electronic devices shifts to a high frequency side, the demand for laminated components having an insulating substrate made of ceramics is increasing. For a capacitor it is MLCC, and for a substrate it is LTCC. The former uses or considers the use of nickel powder for internal electrodes or copper powder for external electrodes as an electrode material, and the latter uses or considers the use of silver powder or copper powder. The copper powder as an electrode material attracts attention, because copper powder is inexpensive as compared with silver powder, as well as more advantageous than nickel in terms of electrical resistance.

The metal powder as the electrode material is mixed with a solvent, a binder resin and the like and processed into a paste, which is printed on a ceramic substrate or a green sheet made of ceramic particles. The resulting laminate is fired in a non-oxidizing atmosphere or reducing atmosphere at 600° C. or higher for example, thereby sintering the metal powders to obtain an electrode. A thermal expansion coefficient of the metal is higher than that of ceramic which is a substrate, and a difference in expansion and contraction is generated during the firing process, so that the fired electrode and the ceramic substrate may be separated. In order to avoid this, ceramic particles forming the ceramic layer or particles called glass frit are added to the metal powder paste, thereby ensuring adhesion between the fired electrode and the ceramic substrate.

The MLCC has limitation of sizes of parts, but if the number of layers can be increased, capacitance per a part can be increased. Therefore, in order to achieve this, it is necessary to apply a thin electrode paste. Further, for the LTCC, a mounting density of the substrate can be increased if a circuit width can be narrowed. Therefore, it is advantageous to be able to print the paste at a fine pitch without disconnection. In order to fulfill such requirements, improvement of a metal powder past and metal powder used for the metal powder paste has been attempted (Patent Document 1, Patent Document 2).

CITATION LIST

Patent Literatures

Patent Document 1: WO 2013/125659 A1
Patent Document 2: WO 2013/118893 A1

SUMMARY OF INVENTION

Technical Problem

As described above, the fired electrode (fired body) has been produced by sintering a paste of metal powder such as copper powder. On the other hand, a composite of the fired body and the ceramic substrate has been increasingly used in a wide temperature range such as on-board application. Therefore, strong adhesion between the fired body and the ceramic substrate is required so that the fired body and the ceramic substrate are not separated even in such a wide temperature range.

Therefore, an object of the present invention is to provide a laminate of a sintered body produced by sintering a copper powder paste and a ceramic substrate, which has improved adhesion between the sintered body and the ceramic substrate.

Solution to Problem

As a result of intensive studies, the present inventors have found that the above object can be achieved by a composite as described below, and completed the present invention.

Thus, the present invention includes the following aspect (1):

(1)

A laminate with a copper powder paste sintered body laminated on a ceramic layer, the laminate comprising portions where one or more elements selected from Si, Ti and Zr derived from a copper powder surface treatment agent are together present with a thickness in a range of from 5 to 15 nm in boundaries between the copper powder paste sintered body and the ceramic layer, when observing the boundaries by scanning the laminate with STEM over 100 nm across the boundaries in a thickness direction of the laminate.

Advantageous Effects of Invention

According to the present invention, it is possible to obtain a laminate of a sintered body produced by sintering a copper powder paste and a ceramic substrate, which has improved adhesion between the sintered body and the ceramic substrate.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 1A-1E are images by elemental mapping of a boundary between a fired body of a laminate of Inventive Example 3 and alumina.

FIGS. 3, 3A and 3B are lattice images of a boundary between a fired body of a laminate of Inventive Example 3 and alumina.

FIGS. 6, 6A, 6B and 6C are electron microscope photographs of a boundary between a fired body of a laminate of Inventive Example 23 and alumina, and lattice images of the corresponding portions.

DESCRIPTION OF THE PREFERRED EMBODIMENTS

Figure 2:
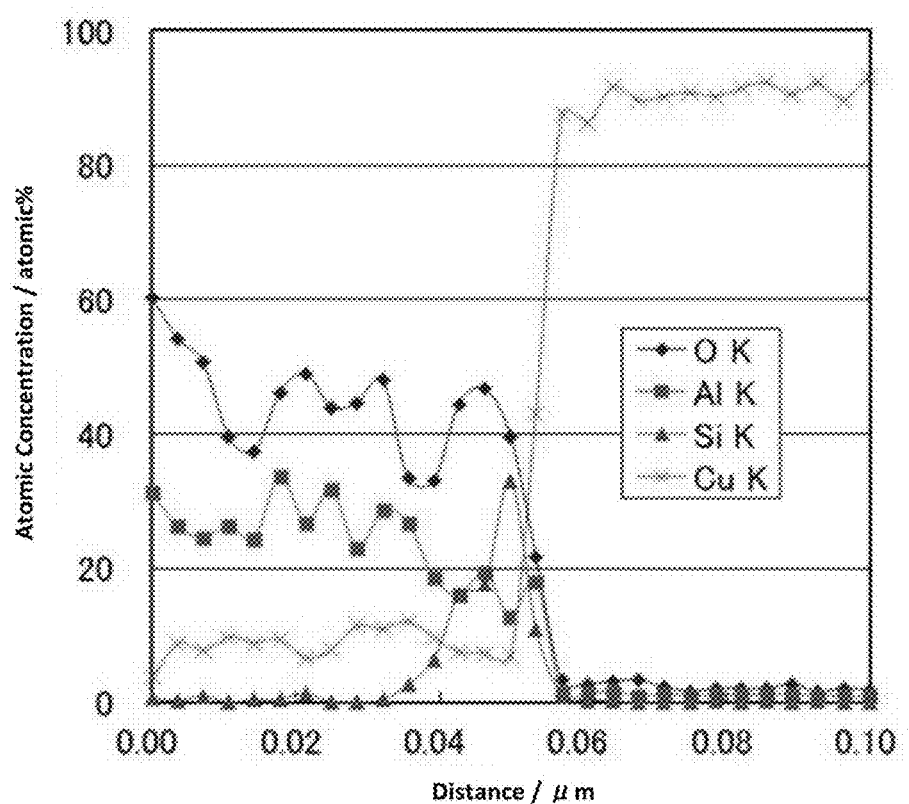
FIG. 2 is a graph of results of plotting each atomic concentration of each element starting from an alumina side (boundary concentration profile) for a boundary between a fired body of a laminate of Inventive Example 3 and alumina.

Hereinafter, the present invention will be described in detail by way of embodiments. The present invention is not limited to the specific embodiments as described below.

[Laminate in which a Copper Powder Paste Sintered Body is Laminated on a Ceramic Layer]

A laminate according to the present invention is a laminate in which a copper powder paste sintered body is laminated on a ceramic layer, and the laminate includes portions where at least one or more elements are selected from Si, Ti and Zr derived from a copper powder surface treatment agent is together present with a thickness in a range of from 5 to 15 nm in boundaries between the copper powder paste sintered body and the ceramic layer, when observing the boundaries by scanning the laminate with STEM over 100 nm across the boundaries in a thickness direction of the laminate.

In a preferred embodiment, the laminate in which the copper powder paste sintered body is laminated on the ceramic layer includes those having such a laminate structure. For example, the laminate includes those in which the copper powder paste sintered body layer is laminated on the ceramic layer, and a ceramic layer is further laminated on the copper powder paste sintered body layer, and also includes laminates formed by repeating these laminations. The term "on a layer" is an expression for explaining a direction of lamination, and is not limited to an upward direction in the vertical direction.

[Copper Powder Paste Sintered Body]

The laminate according to the present invention can be produced by laminating a copper powder paste sintered body on a ceramic layer. The copper powder paste sintered body is prepared by sintering the applied copper powder paste.

In a preferred embodiment, the sintering for preparing the copper powder paste sintered body can be carried out by a known means, for example, by maintaining the copper powder paste in a non-oxidizing atmosphere, a weak reducing atmosphere, or a water vapor atmosphere at a temperature of from 500 to 1000° C. for 0.1 to 10 hours.

Prior to the sintering, the copper powder paste is applied to a surface of the ceramic layer. In a preferred embodiment, the application can be carried out by known means, for example by screen printing or dispensing.

[Copper Powder Paste]

The copper powder paste can be prepared by known methods using surface-treated copper powder. In a preferred embodiment, it can be prepared, for example, by kneading the surface-treated copper powder, a solvent, a binder resin, and known additives. In a preferred embodiment, known solvents may be used as the solvent. Examples of such solvents include alcoholic solvents (for example, one or more selected from the group consisting of terpineol, dihydroterpineol, isopropyl alcohol, butyl carbitol, terpinyloxyethanol, and dihydroterpiyloxyethanol), glycol ether solvents (for example, butyl carbitol), acetate solvents (for example, one or more selected from the group consisting of butyl carbitol acetate, dihydroterpineol acetate, dihydrocarbitol acetate, carbitol acetate, linalyl acetate, and terpinyl acetate), ketone solvents (for example methyl ethyl ketone), hydrocarbon solvents (for example, one or more selected from the group consisting of toluene and cyclohexane), cellosolves (for example, one or more selected from the group consisting of ethyl cellosolve, and butyl cellosolve), diethyl phthalate, or propionate solvents (for example, one or more selected from the group consisting of dihydroterpinyl propionate, dihydrocarbyl propionate, and isobornyl propionate). In a preferred embodiment, as the binder resin, a known binder resin can be used. Examples of such a binder resin includes cellulose resins, acrylic resins, alkyd resins, polyvinyl alcohol resins, polyvinyl acetal, ketone resins, urea resins, melamine resins, polyester, polyamide, and polyurethane.

In a preferred embodiment, the copper powder paste that can be used includes a paste to which a glass frit is not added.

[Surface-Treated Copper Powder]

The surface-treated copper powder is used for preparing the copper powder paste. In a preferred embodiment, for example, submicron copper powder can be used as the surface-treated copper powder. For example, copper powder prepared by a wet method can be used. For example, copper powder prepared by a disproportionation method and a chemical reduction method can be used. In a preferred embodiment, the surface treatment for the copper powder can be carried out by mixing with a solution of a copper powder surface treatment agent. For example, the surface treatment can be carried out by applying the copper powder surface treatment agent as disclosed in Patent Document 1 (WO 2013/125659 A1) and Patent Document 2 (WO 2013/118893 A1) according to procedures disclosed in those documents.

In a preferred embodiment, the surface-treated copper powder that can be used includes copper powder having a specific surface area of 1 $m^2g^{-1}$ or more, and preferably 2 $m^2g^{-1}$ or more, for example.

[Ceramic Layer]

In a preferred embodiment, a ceramic substrate can be used as the ceramic layer. As ceramics of the ceramic substrate, well-known ceramics can be used. Such ceramics include ceramics mainly based on alumina and barium titanate; ceramics which are a sintered body of CuNiZn ferrite particles, and ceramics made of one or more of silicon nitride, aluminum nitride, $CaZrO_3$, $CaTiO_3$, $HfO_2$, $BaTi_2O_5$, and $(K,Na)NbO_3$. Each of these ceramics can be prepared from known materials by known means.

In a preferred embodiment, the ceramics that can be used include a ceramic in which an element having the highest atomic concentration among elements excluding O (oxygen) is Si and an element having the secondly highest atomic concentration is Al.

[Boundary Between Copper Powder Paste Sintered Body and Ceramic Layer]

Boundaries between the copper powder paste sintered body and the ceramic layer are formed so as to have portions where one or more elements selected from Si, Ti and Zr derived from a copper powder surface treatment agent are together present with a thickness in a range of from 5 to 15 nm, when observing the boundaries by scanning the laminate with STEM over 100 nm across the boundaries in the thickness direction of the laminate. The term "together" means that the thicknesses of the element in the portions may be calculated by summing the thicknesses of the respective elements as described above. In a preferred embodiment, one element selected from Si, Ti and Zr derived from the copper powder surface treatment agent is present alone with a thickness in the range of from 5 to 15 nm, when observing the boundaries by scanning the laminate with STEM over 100 nm across the boundaries in the thickness direction of the laminate.

In a preferred embodiment, the thickness may be, for example, from 5 to 15 nm.

As used herein, the phrase "one or more elements selected from Si, Ti and Zr derived from the copper powder surface treatment agent are present" means that one or more of Si, Ti and Zr are observed by 1% or more in total, when the total atomic concentration of Cu, elements forming the ceramics and the above three elements are 100% as analyzed with EDS over 100 nm in the boundary thickness direction of the laminate.

When the boundaries are observed by scanning the laminate with STEM over 100 nm across the boundaries in the thickness direction of the laminate, the scanning is preferably carried out such that the boundary is located near the center of 100 nm, that is, from 45 to 55 nm, for example.

In a preferred embodiment, one or more elements selected from Si, Ti and Zr derived from the copper powder surface treatment agent are those distributed from the copper powder paste side to the boundary, and can be recognized by those skilled in the art from the state of the distribution in the profiling of the atomic concentrations.

Alternatively, in a preferred embodiment, when observing the concentration distribution of one or more elements selected from Si, Ti and Zr derived from the copper powder surface treatment agent, particles in which the distribution of Si, Ti and Zr derived from the copper powder surface treatment agent is easily observed can be selected in the case where a plurality of particles are present in the ceramic layer, and the selected particles can be used for observing the state of the boundaries. For example, in the boundaries between the silica particles and the ceramic layer containing alumina particles, the alumina particles can be selected as a representative to measure the thickness.

The present inventors have found that when such a state of the boundaries is used as an index, the laminate exhibits improved adhesion of the laminated layers, and results of the tape peeling test is good, and additionally good specific resistance is also achieved, and have completed the present invention. Although its mechanism is not known, the present inventors believe that in such a state of the boundaries, a very thin amorphous layer of Si, Ti or Zr is formed at the boundaries between the layer (crystal layer) of the copper powder paste sintered body and the ceramic layer, thereby realizing improved adhesion. The present inventors also believe that such a very thin amorphous layer is appropriately formed near the boundaries, whereby it is effective that the surface-treated copper powder in the copper powder paste is sufficiently dispersed in the paste.

In a preferred embodiment, assuming that when the boundaries between the copper powder paste sintered body and the ceramic layer are observed by scanning the laminate with STEM over 100 nm across the boundaries in the thickness direction of the laminate, the total concentration of the atomic concentrations of one or more elements selected from Si, Ti and Zr derived from the copper powder surface treatment agent is Z %, the maximum value of Z in the scanning range over 100 nm is from 1 to 50%, for example. In a preferred embodiment, the maximum value of Z in the scanning over 100 nm may be, for example, from 1 to 50%. In a preferred embodiment, in place of the scanning over 100 nm, scanning over 100 to 800 nm may be used. The maximum value of Z in the scanning over 100 to 800 nm may be, for example, from 10 to 40%.

However, when the total concentration of the atomic concentrations of one or more elements selected from Si, Ti and Zr derived from the copper powder surface treatment agent is Z %, the sum of the atomic concentrations of the elements derived from the copper powder paste sintered body and the atomic concentrations of the elements derived from the ceramics is 100%. The elements derived from the copper powder paste sintered body include Si, Ti or Zr, for example when the surface treatment agent containing Si, Ti or Zr is used as a surface treatment agent of copper powder, in addition to Cu, C, and/or O. The elements derived from the ceramics are determined according to the composition of each ceramic. For example, in the case of alumina, Al and O are included. For example, in the case of barium titanate, Ti, Ba and O are included. For example, in the case of silicon nitride, Si and N are included. For example, in the case of silica, Si and O are included. For example, in the case of a NiZnCu sintered body, Ni, Zn, and Cu are included.

[Specific Resistance]

In a preferred embodiment, the copper powder paste sintered body of the laminate in which the copper powder paste sintered body is laminated on the ceramic layer exhibits good specific resistance. In a preferred embodiment, it can be, for example, in a range of from 1.7 to 10 µΩ·cm, or in a range of from 1.8 to 3.4 µΩ·cm. The specific resistance can be measured by known means.

[Peeling Test]

In a preferred embodiment, the laminate in which the copper powder paste sintered body is laminated on the ceramic layer exhibits good properties in a tape peeling test, that is, exhibits improved adhesion. The tape peeling test can be performed by the procedure of Inventive Example as described below.

PREFERRED EMBODIMENT

In a preferred embodiment, the present invention includes the following aspects, in addition to the aspect (1):

(1)

A laminate with a copper powder paste sintered body laminated on a ceramic layer, the laminate comprising portions where one or more elements selected from Si, Ti and Zr derived from a copper powder surface treatment agent are together present with a thickness in a range of from 5 to 15 nm in boundaries between the copper powder paste sintered body and the ceramic layer, when observing the boundaries by scanning the laminate with STEM over 100 nm across the boundaries in a thickness direction of the laminate.

(2)

The laminate according to (1), wherein when observing the boundaries by scanning the laminate with STEM over 100 nm across the boundaries in the thickness direction of the laminate, a maximum value of Z in the scanning range is from 1 to 50%, in which Z in percentage represents a total concentration of atomic concentrations of one or more elements selected from Si, Ti and Zr derived from the copper powder surface treatment agent, provided that the sum of the atomic concentrations of the elements derived from the copper powder paste sintered body and atomic concentrations of elements derived from ceramics is 100%.

(3)

The laminate according to (1), wherein when observing the boundaries by scanning the laminate with STEM over 100 nm to 800 nm across the boundaries in the thickness direction of the laminate, a maximum value of Z in the scanning range is from 10 to 40%, in which Z in percentage represents a total concentration of atomic concentrations of one or more elements selected from Si, Ti and Zr derived from the copper powder surface treatment agent, provided that the sum of the atomic concentrations of the elements derived from the copper powder paste sintered body and atomic concentrations of elements derived from ceramics is 100%.

(4)

The laminate according to any one of (1) to (3), wherein the copper powder paste sintered body is a sintered body of a copper powder paste containing no glass frit.

(5)

The laminate according to any one of (1) to (4), wherein the copper powder paste sintered body is a sintered body of a copper powder paste having a specific surface area of 1 $m^2g^{-1}$ or more.

(6)

The laminate according to any one of (1) to (5), wherein the ceramic layer is a layer of alumina, a layer mainly based on barium titanate, a layer of a sintered body of CuNiZn ferrite particles, a layer of aluminum nitride or a layer of silicon nitride.

(7)

The laminate according to any one of (1) to (6), wherein in the ceramics of the ceramic layer, an element having a highest atomic concentration among elements other than O is Si, and an element having a secondly highest atomic concentration is Al.

(8)

A composite of copper and ceramics, comprising the laminate according to any one of (1) to (7).

(9)

An electronic component comprising the laminate according to any one of (1) to (7).

(10)

An electronic device comprising the electronic component according to (9).

Thus, the present invention includes the laminate as described above, the composite of copper and ceramics comprising the laminate as described above, the electronic components comprising these, and an electronic device comprising the electronic components.

In a preferred embodiment, the laminate according to the present invention may be made as part of the electronic component, and may be provided as part of a capacitor such as MLCC, or a substrate such as LTCC, for example. In a preferred embodiment, the laminate according to the present invention includes an embodiment prepared by drilling holes in a ceramic multi-layered substrate for interlayer connection, filling the holes with the copper powder paste and firing it. In a preferred embodiment, the laminate according to the present invention includes an embodiment where the copper powder paste sintered body is used as an electrode. For example, the embodiment is such that the thickness of the electrode is from 0.1 to 1000 μm, and preferably from 0.3 to 100 μm, and even more preferably from 0.5 to 50 μm. In a preferred embodiment, the laminate according to the present invention includes an embodiment where the copper powder paste sintered body is used as a wiring of a circuit. For example, the embodiment is such that a wiring pitch (circuit width) is from 1 to 5000 μm, and preferably from 5 to 3000 μm.

EXAMPLES

The present invention will be described in more detail by way of the following examples. The present invention is not limited to the following examples.

Example 1: Preparation of Submicron Copper Powder 2.5 L of 25 vol % diluted sulfuric acid was instantaneously added to a slurry consisting of 1 kg of cuprous oxide, 4 g of gum arabic and 7 L of pure water, and stirred at 500 rpm for 10 minutes. After the copper powder obtained in the operation was sufficiently precipitated, the resulting supernatant was removed, 7 L of pure water was added, and the mixture was stirred at 500 rpm for 10 minutes. This operation was repeated until a Cu concentration derived from $Cu^{2+}$ in the supernatant was less than 1 g/L.

Example 2: Inventive Examples 1 to 3

(Surface Treatment of Copper Powder)

5, 40 and 60 mL of diaminosilane (A-1120 (available from MOMENTIVE)) were collected, mixed with pure water so as to have 500 mL in total, and stirred overnight at about 200 rpm. Each supernatant of the precipitated slurry prepared in Example 1 was removed, and the precipitated copper powder and an aqueous diaminosilane solution were stirred at 500 rpm for 1 hour. After stirring, solid-liquid separation was performed using a table-top centrifugal separator under conditions of 1500 rpm for 30 minutes to obtain a solid (a water content of from 10 to 13%). The solid is dried in a nitrogen atmosphere at 100° C. for 2 hours, and then crushed with a pestle and mortar until the total amount of the solid passed through a 1 mm sieve, and then ground with a bench jet mill under a grinding pressure of 0.4 MPa. A BET specific surface area of the powder obtained by grinding was measured by a fluid method using Macsorb HM model-1201 (one-point method of the fluid method; degassing conditions: 150° C., 20 minutes, atmospheric pressure, nitrogen flow). It was from 3.1 to 3.2 $m^2g^{-1}$.

(Preparation of Paste)

A vehicle previously prepared by kneading terpineol and ethylcellulose in a rotation revolution mixer was mixed with oleic acid and copper powder such that a ratio of the vehicle, oleic acid and copper powder was copper powder:ethyl cellulose:oleic acid:terpineol=80:2.3:1.6:16.1 (weight ratio), pre-kneaded with a rotation revolution mixer, and then passed through three rolls (a finish roll gap of 5 μm), and defoamed using the rotation revolution mixer. The resulting paste was coated onto a slide glass using a 25 μm gap applicator and dried at 120° C. for 10 minutes. Rz of the resulting coated film in the coating direction was measured with a contact needle type roughness meter, confirming that an average at five points was 2 μm or less. That is, it was confirmed that the size of aggregates contained in the paste was 2 μm or less.

(Production of Laminate of Sintered Body and Ceramics)

Three lines having a width of 5 mm and a length of 20 mm were printed on an alumina substrate (purity 99.5%) having a surface roughness Ra of 0.04 μm using a screen printing plate (stainless mesh; a wire diameter of 18 μm; a gauze thickness of 38 μm; opening of 33 μm; an opening ratio of 42%). This was fed at a rate of 0.75° C./min up to 850° C. and maintained at 850° C. for 20 minutes while bubbling pure water with nitrogen at 25° C. and feeding the nitrogen-containing water vapor at a rate of 2 L/min. Thus, the fired body of the paste was formed on the ceramic substrate to obtain a laminate of a fired body and ceramics.

(Measurement of Resistance and Peeling Test)

A surface resistance and a thickness of a circuit having a width of 5 mm and a length of 20 mm obtained by cooling to room temperature was measured, and a specific resistance was determined by averaging three points. Further, using a carbon double-sided tape (available from Nisshin EM Co., Ltd.) for the circuit and the substrate, a peeling test was conducted according to JIS Z 0237 to confirm whether or not the circuit adhered to the adhesive surface of the tape.

(STEM Observation and EDS Analysis)

Furthermore, in order to observe boundaries between the fired body and the alumina substrate, a cross-section of the circuit portion of the resulting laminate of the fired body and ceramics was processed using FIB, and the boundaries were analyzed by STEM and EDS.

Device: STEM;

Cross-sectional TEM image magnification: from 10 to 500,000 times (*observation magnification was adjusted as needed);

Characteristic X-ray;

Beam diameter of irradiated electrons: 1 nm;

Scanning distance: 100 nm (adjusted such that each distance of the fired electrode and the ceramic substrate were approximately 50 nm);

Thickness: the distance in which 50 atomic % of the maximum value of the concentration profile of the characteristic X-ray of the coupling agent-forming inorganic elements was regarded as the thickness.

FIGS. 1A-1E shows images by the element mapping of the boundary in Inventive Example 3.

FIG. 2 is a graph showing the results of plotting each atomic concentration of each element starting from the alumina side (boundary concentration profile) for the boundary between the sintered body in Inventive Example 3 and alumina.

Figure 3:
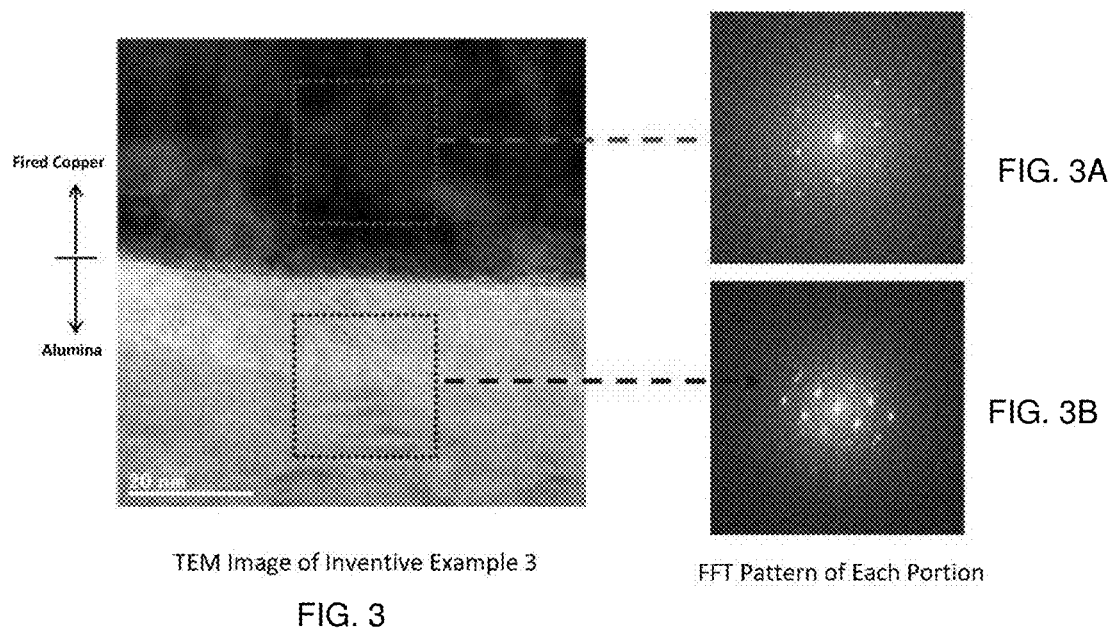
Figures 4A, 4B, 4C, 4D, 4E:
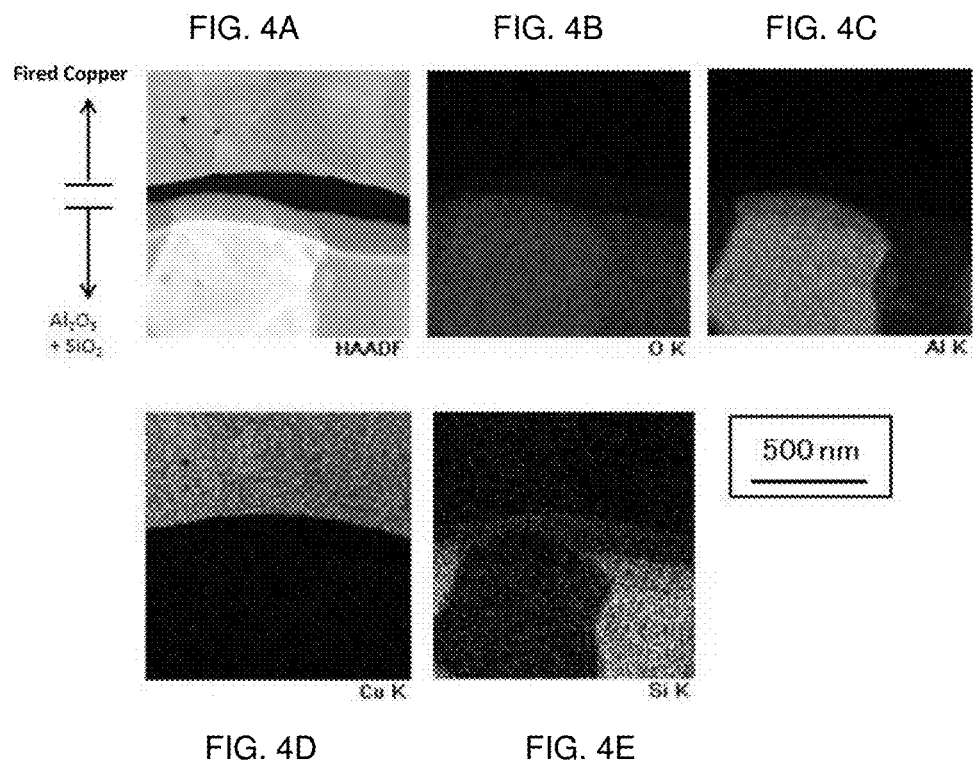
FIG. 4A-4E are images by elemental mapping of a boundary between a fired body of a laminate of Inventive Example 23 and alumina.

FIGS. 3, 3A and 3B show lattice images of the boundary in Inventive Example 3.

Example 3: Inventive Example 4

The same operation as that of Inventive Example 3 of Example 2 was carried out, with the exception that the composition of the paste was copper powder:ethyl cellulose:terpineol=80:2.3:17.7 (weight ratio).

Example 4: Inventive Example 5

The same operation as that of Example 2 was carried out with the exception that in the step of the surface treatment, 20 mL of diaminosilane (A-1120 (available from MOMENTIVE)), 10 mL of epoxysilane (Z-6040 (available from Dow Toray Co., Ltd.)) and 470 mL of pure water were used.

Example 5: Inventive Example 6

The same operation as that of Example 4 was carried out with the exception that in the step of the surface treatment, epoxysilane was changed to tetraethoxysilane (available from Tokyo Chemical Industry Co., Ltd.).

Example 6: Inventive Example 7

The same operation as that of Inventive Example 3 of Example 2 was carried out with the exception that in the step of the surface treatment, diaminosilane was changed to a titanate coupling agent (PLENACT 44 (available from Ajinomoto Fine-Techno Co., Ltd.)).

Example 7: Inventive Example 8

The same operation as that of Example 4 was carried out with the exception that in the step of the surface treatment, 30 mL of diaminosilane (A-1120 (available from MOMENTIVE)), 20 mL of a titanate coupling agent (PLENACT 44 available from Ajinomoto Fine-Techno Co., Ltd.), and 450 mL of pure water were used.

Example 8: Inventive Example 9

The same operation as that of Example 4 was carried out with the exception that in the step of the surface treatment, 30 mL of a titanate coupling agent (PLENACT 44 (available from Ajinomoto Fine-Techno Co., Ltd.)), 40 mL of an organic zirconium compound (ORGATIX ZC-300 (available from Matsumoto Fine Chemical Co., Ltd.)), and 430 mL of pure water were used.

Example 9: Inventive Example 10

The same operations as that of Example 4 were carried out with the exception that in the step of the surface treatment, 30 mL of diaminosilane (A-1120 (available from MOMENTIVE)), 40 mL of an organic zirconium compound (ORGATIX ZC-300 (available from Matsumoto Fine Chemical Co., Ltd.)) and 430 mL of pure water were used.

Example 10: Inventive Examples 11 to 13

The same operations as that of Example 2 were carried out with the exception that the pastes of Examples 1 to 3 were used and the firing atmosphere was changed to $N_2$.

Example 11: Inventive Example 14

The same operation as that of Example 2 was carried out with the exception that the paste of Example 2 was used and the firing atmosphere was changed to $N_2$ containing 2% of $H_2$.

Example 12: Inventive Examples 15 to 17

(Preparation of Ceramic Substrate)

$BaTiO_3$ particles (available from Nisshin Engineering Co., Ltd.; a particle diameter of 50 nm), terpineol and ethylcellulose were mixed such that a ratio of them was $BaTiO_3$ particles:ethyl cellulose:terpineol=50:10:40 (weight ratio), pre-kneaded with a rotation revolution mixer, and then passed through three rolls (a finish roll gap of 5 μm) and defoamed using the rotation revolution mixer. The resulting paste was coated onto a PET film using a 25 μm gap applicator and dried at 120° C. for 10 minutes. The PET film was removed from the dried coating, and the dried coating was fired at 1200° C. in an air atmosphere.

(Production of Laminate of Sintered Body and Ceramics)

The same operation as that of Example 2 was carried out with the exception that the paste of Example 3 was printed on the resulting substrate, and the firing atmosphere was changed to $N_2$, water vapor, or $N_2$ containing 2% $H_2$.

Example 13: Inventive Example 18

The paste of Inventive Example 7 was printed on the $BaTiO_3$ sheet (fired at 1200° C.) prepared in Example 12, and the same operation as that of Example 12 (Inventive Example 17) was carried out. When analyzing the boundaries by STEM, the thickness of Ti derived from the titanate coupling agent was calculated based on a region where Ba and Ti coexisted, for Ti derived from $BaTiO_3$ and Ti derived from the titanate coupling agent.

Example 14: Inventive Examples 19 to 21

The same operation as that of Example 2 was carried out with the exception that the substrate was printed on a silicon nitride substrate (available from Toshiba Material Co., Ltd.) using the paste of Inventive Example 3 and the firing atmosphere was $N_2$, water vapor or $N_2$ containing 2% $H_2$.

Example 15: Inventive Example 22

(Preparation of Ceramic Substrate, Preparation and Evaluation of Laminate of Sintered Body and Ceramics)

Alumina particles and silica particles were crushed at a weight ratio of 1:1 using zirconia beads, mixed such that a ratio of ethyl cellulose and terpineol was (alumina+zirconia):ethyl cellulose:terpineol=50:10:40 (weight ratio), and then pre-kneading with a rotation revolution mixer, and passed through three rolls (a finish roll gap of 5 μm) and defoamed using the rotation revolution mixer. The resulting paste was coated onto a PET film using a 25 μm gap applicator and dried at 120° C. for 10 minutes. The Ra of the dried coating was 0.25 μm. The PET film was removed from the dried coating and the paste of Inventive Example 3 was printed.

The temperature was increased to 700° C. at a rate of 0.75° C./min and maintained at 700° C. for 20 minutes while feeding nitrogen at a rate of 2 L/min, with which pure water was bubbled at 25° C.

The same operation as that of Example 2 was carried out and the resulting laminate was evaluated.

Example 16: Inventive Example 23

The paste of Inventive Example 3 was printed on the alumina/silica green sheet prepared in Example 15, and the temperature was increased to 500° C. at a rate of 0.75° C./min and maintained at 500° C. for 20 minutes while feeding the atmosphere from a compressor at a rate of 2 L/min. Subsequently, the temperature was increased to 850° C. at a rate of 0.75° C./min and maintained at 850° C. for 20 minutes while feeding $N_2$ containing 2% $H_2$ at a rate of 2 L/min. In the boundary analysis, when operation was carried out from the top of the silica particles formed on the green sheet side toward the fired copper, it was not possible to distinguish whether it was the green sheet-forming particles or derived from the copper powder surface treatment components, so the alumina particles were scanned toward the fired copper. Beside this, the same operation as that of Example 2 was carried out.

FIGS. 4A-4E show elemental mapping images of the boundary in Inventive Example 23.

Figure 5:
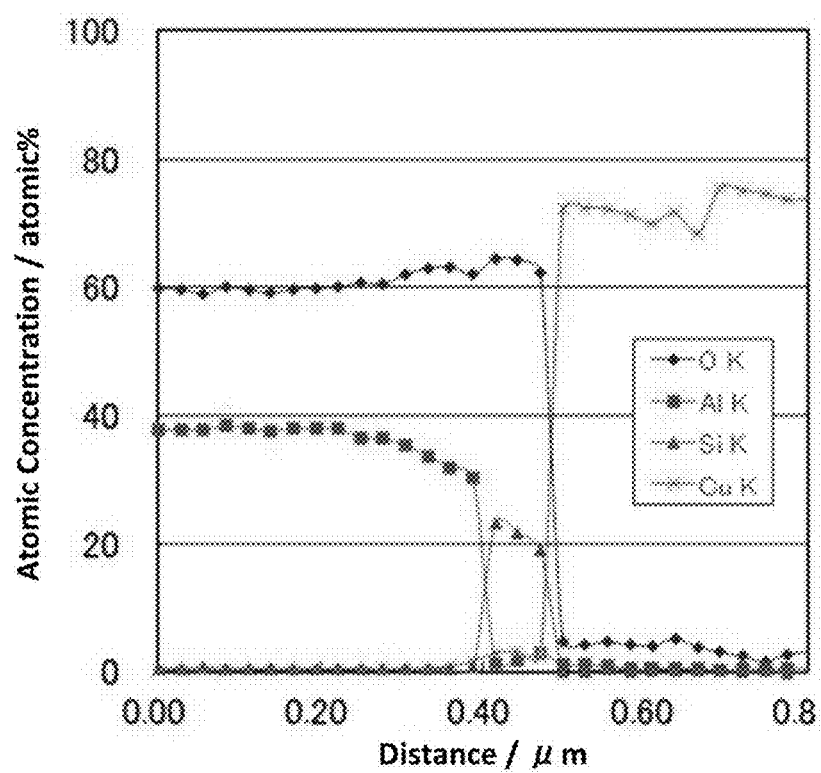
FIG. 5 is a graph of results of plotting each atomic concentration of each element starting from an alumina side (boundary concentration profile) for a boundary between a fired body of a laminate of Inventive Example 23 and alumina.

FIG. 5 is a graph showing the results of plotting each atomic concentration of each element starting from the alumina side (boundary concentration profile) for the boundary between the sintered body in Inventive Example 23 and alumina.

FIGS. 6, 6A, 6B and 6C show lattice images of the boundary in Inventive Example 23. The upper view on the right (Diff-1) (FIG. 6A), the middle view (Diff-2) (FIG. 6B), and the lower view (Diff-3) are images showing lattice images at corresponding portions in the left view, respectively. From the upper view on the right (Diff-1) (FIG. 6A), the broad annular diffraction pattern was confirmed for the purified silica layer at the boundary between the fired copper and the green sheet fired body, and no regular diffraction spots were confirmed. Therefore, it could be confirmed that it was amorphous. From the middle view (Diff-2) (FIG. 6B), the regular diffraction spots were confirmed for the alumina particles generated on the green sheet side after firing. Therefore, it could be confirmed that the crystal structure was obtained. From the lower view (Diff-3) (FIG. 6C), the broad ring-like diffraction pattern was confirmed for the silica particles generated on the green sheet side after firing, and no regular diffraction spot was confirmed. Therefore, it was confirmed that it was amorphous.

Example 17: Inventive Example 24

(Preparation of Ceramic Substrate, Preparation and Evaluation of Laminate of Sintered Body and Ceramics)

Ferrite particles (an average particle diameter of 0.1 μm) of NiCuZn with $Fe_2O_3$:NiO:CuO:ZnO=49.5:10.0:10.0:30.5 (molar ratio), ethylcellulose and terpineol were mixed such that a ratio of them was NiCuZn particle:ethyl cellulose:terpineol=50:10:40 (weight ratio), pre-kneading with a rotation revolution mixer, and then passed through three rolls (a finish roll gap of 5 μm) and defoamed using the rotation revolution mixer. The resulting paste was coated onto a PET film using a 25 μm gap applicator and dried at 120° C. for 10 minutes. The Ra of the dried coating was 0.25 μm. The PET film was removed from the dried coating and the paste of Example 3 was printed.

The temperature was increased to 700° C. at a rate of 0.75° C./min and maintained at 700° C. for 20 minutes while feeding nitrogen at a rate of 2 L/min, with which pure water was bubbled at 25° C.

The same operation as that of Example 2 was carried out and the resulting laminate was evaluated.

Example 18: Inventive Example 25

The paste of Inventive Example 3 was printed on the NiZnCu green sheet prepared in Example 17, and the temperature was increased to 500° C. at a rate of 0.75° C./min and maintained at 500° C. for 20 minutes while feeding the atmosphere from a compressor at a rate of 2 L/min. Subsequently, the temperature was increased to 850° C. at a rate of 0.75° C./min and maintained at 850° C. for 20 minutes while feeding $N_2$ containing 2% $H_2$ at a rate of 2 L/min. The same operation as that of Example 2 was carried out and the resulting laminate was evaluated.

Example 19: Comparative Examples 1 to 5

The copper powder prepared in Example 1 is centrifuged and dried without treatment with a coupling agent, and the resulting copper powder was processed into a paste according to the procedure of Example 2, and the same operations as those of Examples 11, 12 (Inventive Example 17), 14 (Inventive Example 21), 16 and 18 were carried out, and the resulting laminate was evaluated. Since the paste containing the copper powder which had not been subjected to the predetermined surface treatment was used, the copper powder surface treatment components were not present at the boundaries between the copper and the ceramic, so that the adhesion between them would be insufficient.

Example 20: Comparative Examples 6 to 8

5 mL of diaminosilane (A-1120 (available from MOMENTIVE)) was collected, mixed with pure water so as to have 500 mL in total, and stirred overnight at about 200 rpm. The resulting supernatant of the precipitated slurry prepared in Example 1 was removed, and the precipitated copper powder and an aqueous diaminosilane solution were stirred at 500 rpm for 5 hours. Surface-treated copper powder was then obtained by the procedure of Example 2. The copper powder was mixed such that a ratio of copper powder:ethyl cellulose:oleic acid:terpineol=80:2.3:1.6:16.1 (weight ratio), and kneaded by a rotation revolution mixer to prepare pastes. Using the pastes, laminates were prepared by the procedure of Example 2 and evaluated. For these pastes, a large number of particles at a visually observable level were observed in the coating after screen printing of Example 2. This would be because the dispersibility was decreased and aggregates were generated due to the differences in the time treated with the coupling agent, the paste preparation conditions, and the like from those of Example 2.

(Results)

The results of Inventive Examples and Comparative Examples are summarized in Table 1 below. In Comparative Examples 1 to 8, any boundary could not be observed because the boundaries were separated due to the impact when trying to process the samples for cross-sectional observation.

It was confirmed that a layer of an element derived from the copper powder surface treatment agent was present at the boundaries between the sintered metal and the substrate even by $N_2$ firing, whereas the layer was more concentrated at the boundaries by steam firing and firing in the atmosphere containing $H_2$.

As can be seen from the FFTs in FIGS. 3, 3A and 3B and FIGS. 6, 6A, 6B, and 6C, the sintered metal having the crystal structure and the amorphous ceramic layer are firmly joined via the concentrated layer of the elements derived from the surface treatment agent of copper powder. In Inventive Example 23 where the layer formed at the boundaries between the sintered copper and ceramic substrate is thick, the lattice images of the formed layer indicate that the layer is amorphous. Considering this in combination with the elemental analysis results, it can be said that the silica layer derived from the surface treatment component of copper powder was formed. Since the laminate having the structure according to the present invention has high adhesion and low specific resistance, it can be suitable for wiring materials of LTCC, internal electrodes of MLCC, and external electrodes.

TABLE 1

| | Adhesion Amount of Copper Powder Surface Treatment Element/ppm | | | | Firing Atmosphere | | | Boundary | | | | |
|---|---|---|---|---|---|---|---|---|---|---|---|---|
| | Si | Ti | Zr | Substrate | $N_2$ | $H_2O/N_2$ | 2% $H_2$ | Analyzed Boundary | Maximum Thickness/ nm | Atomic Concentration/ % | Specific Resistance/ μΩ cm | Tape Peeling |
| Inventive Example 1 | 360 | — | — | Alumina | ○ | | | Alumina | 6.9 | 30 | 1.8 | None |
| Inventive Example 2 | 1000 | — | — | | ○ | | | Alumina | 6.9 | 23 | 2.0 | None |
| Inventive Example 3 | 1500 | — | — | | ○ | | | Alumina | 11 | 33 | 2.2 | None |
| Inventive Example 4 | 1500 | — | — | | ○ | | | Alumina | 11 | 31 | 2.2 | None |
| Inventive Example 5 | 2300 | — | — | | ○ | | | Alumina | 21 | 26 | 2.4 | None |
| Inventive Example 6 | 2100 | — | — | | ○ | | | Alumina | 19 | 32 | 2.5 | None |
| Inventive Example 7 | — | 980 | — | | ○ | | | Alumina | 5.8 | 25 | 2.1 | None |
| Inventive Example 8 | 980 | 450 | — | | ○ | | | Alumina | 10 | 31 | 2.2 | None |
| Inventive Example 9 | — | 650 | 550 | | ○ | | | Alumina | 9.5 | 27 | 2.1 | None |
| Inventive Example 10 | 950 | — | 430 | | ○ | | | Alumina | 9.1 | 25 | 2.2 | None |
| Inventive Example 11 | 360 | — | — | | | ○ | | Alumina | 11 | 4.8 | 2.9 | None |
| Inventive Example 12 | 1000 | — | — | | | ○ | | Alumina | 15 | 2.2 | 2.4 | None |
| Inventive Example 13 | 1500 | — | — | | | ○ | | Alumina | 7.7 | 1.7 | 2.3 | None |
| Inventive Example 14 | 1000 | — | — | | | | ○ | Alumina | 10 | 25 | 2.5 | None |
| Inventive Example 15 | 1500 | — | — | $BaTiO_3$ | ○ | | | $BaTiO_3$ | 8.0 | 2.5 | 2.5 | None |
| Inventive Example 16 | 1500 | — | — | | | ○ | | $BaTiO_3$ | 11 | 31 | 2.3 | None |
| Inventive Example 17 | 1500 | — | — | | | | ○ | $BaTiO_3$ | 10 | 29 | 2.6 | None |
| Inventive Example 18 | — | 980 | — | | | | ○ | $BaTiO_3$ | 11 | 24 | 2.5 | None |
| Inventive Example 19 | 1500 | — | — | SiN | ○ | | | SiN | 7.5 | 2.2 | 3.4 | None |
| Inventive Example 20 | 1500 | — | — | | | ○ | | SiN | 10 | 24 | 2.9 | None |
| Inventive Example 21 | 1500 | — | — | | | | ○ | SiN | 10 | 26 | 3.0 | None |
| Inventive Example 22 | 1500 | — | — | $Al_2O_3$ + $SiO_2$ Green Sheet | ○ | | | Alumina Particle | 12 | 30 | 2.4 | None |

TABLE 1-continued

| | Adhesion Amount of Copper Powder Surface Treatment Element/ppm | | | | Firing Atmosphere | | | Boundary | | | Specific | |
|---|---|---|---|---|---|---|---|---|---|---|---|---|
| | | | | | Atmosphere/ | | | | Maximum Atomic | | | |
| | Si | Ti | Zr | Substrate | $N_2$ | $H_2O/N_2$ | 2% $H_2$ | Analyzed Boundary | Thickness/ nm | Concentration/ % | Resistance/ μΩ cm | Tape Peeling |
| Inventive Example 23 | 1500 | — | — | | | | ◯ | Alumina Particle | 100 | 23 | 2.3 | None |
| Inventive Example 24 | 1500 | — | — | NiZnCu Green Sheet | | ◯ | | NiZnCu | 11 | 29 | 2.4 | None |
| Inventive Example 25 | 1500 | — | — | | | | ◯ | NiZnCu | 11 | 28 | 2.3 | None |
| Comparative Example 1 | — | — | — | Alumina | | | ◯ | — | — | — | 3.5 | Yes |
| Comparative Example 2 | — | — | — | $BaTiO_3$ | | | ◯ | — | — | — | 6.5 | Yes |
| Comparative Example 3 | — | — | — | SiN | | | ◯ | — | — | — | 8.1 | Yes |
| Comparative Example 4 | — | — | — | $Al_2O_3$ + $SiO_2$ | | | ◯ | — | — | — | 5.2 | Yes |
| Comparative Example 5 | — | — | — | NiZnCu | | | ◯ | — | — | — | 5.9 | Yes |
| Comparative Example 6 | 880 | — | — | Alumina | ◯ | | | — | — | — | 3.2 | Yes |
| Comparative Example 7 | 880 | — | — | | | ◯ | | — | — | — | 2.8 | Yes |
| Comparative Example 8 | 880 | — | — | | | | ◯ | — | — | — | 3.4 | Yes |

INDUSTRIAL APPLICABILITY

The present invention provides a laminate of a sintered body produced by sintering a copper powder paste and a ceramic substrate, which has improved adhesion between the sintered body and the ceramic substrate. The present invention is an industrially useful invention.

What is claimed is:

1. A laminate with a copper powder paste sintered body laminated on a ceramic layer, the laminate comprising portions where one or more elements selected from Si, Ti and Zr derived from a copper powder surface treatment agent are together present with a thickness in a range of from 5.8 nm to 15 nm in boundaries between the copper powder paste sintered body and the ceramic layer, when observing the boundaries by scanning the laminate with STEM over 100 nm across the boundaries in a thickness direction of the laminate.

2. The laminate according to claim 1, wherein when observing the boundaries by scanning the laminate with STEM over 100 nm across the boundaries in the thickness direction of the laminate, a maximum value of Z in the scanning range is from 1 to 50%, in which Z in percentage represents a total concentration of atomic concentrations of one or more elements selected from Si, Ti and Zr derived from the copper powder surface treatment agent, provided that the sum of the atomic concentrations of the elements derived from the copper powder paste sintered body and atomic concentrations of elements derived from ceramics is 100%.

3. The laminate according to claim 1, wherein when observing the boundaries by scanning the laminate with STEM over 100 nm to 800 nm across the boundaries in the thickness direction of the laminate, a maximum value of Z in the scanning range is from 10 to 40%, in which Z in percentage represents a total concentration of atomic concentrations of one or more elements selected from Si, Ti and Zr derived from the copper powder surface treatment agent, provided that the sum of the atomic concentrations of the elements derived from the copper powder paste sintered body and atomic concentrations of elements derived from ceramics is 100%.

4. The laminate according to claim 1, wherein the copper powder paste sintered body is a sintered body of a copper powder paste containing no glass frit.

5. The laminate according to claim 1, wherein the copper powder paste sintered body is a sintered body of a copper powder paste having a specific surface area of 1 $m^2g^{-1}$ or more.

6. The laminate according to claim 1, wherein the ceramic layer is a layer of alumina, a layer mainly based on barium titanate, a layer of a sintered body of CuNiZn ferrite particles, a layer of aluminum nitride or a layer of silicon nitride.

7. The laminate according to claim 1, wherein in the ceramics of the ceramic layer, an element having a highest atomic concentration among elements other than O is Si, and an element having a secondly highest atomic concentration is Al.

8. An electronic component comprising the laminate according to claim 1.

9. An electronic component comprising the laminate according to claim 2.

10. An electronic component comprising the laminate according to claim 3.

11. An electronic component comprising the laminate according to claim 4.

12. An electronic component comprising the laminate according to claim 5.

13. An electronic component comprising the laminate according to claim 6.

14. An electronic component comprising the laminate according to claim 7.

15. An electronic device comprising the electronic component according to claim 8.

* * * * *